United States Patent
Jiang

(10) Patent No.: US 11,076,367 B2
(45) Date of Patent: Jul. 27, 2021

(54) POWER HEADROOM REPORT TRANSMISSION METHOD AND APPARATUS

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/896,911

(22) Filed: Jun. 9, 2020

(65) Prior Publication Data

US 2020/0305093 A1 Sep. 24, 2020

Related U.S. Application Data

(63) Continuation of application No. PCT/CN2017/118342, filed on Dec. 25, 2017.

(51) Int. Cl.
*H04W 52/36* (2009.01)
*H04W 52/42* (2009.01)

(52) U.S. Cl.
CPC ......... *H04W 52/365* (2013.01); *H04W 52/42* (2013.01)

(58) Field of Classification Search
CPC ... H04W 52/42; H04W 52/365; H04W 24/10; H04L 5/0053
See application file for complete search history.

(56) References Cited

U.S. PATENT DOCUMENTS

| 9,386,470 | B2 * | 7/2016 | Baldemair | .......... H04W 52/146 |
| 2013/0010720 | A1 * | 1/2013 | Lohr | ..................... H04L 5/0055 |
| | | | | 370/329 |

(Continued)

FOREIGN PATENT DOCUMENTS

| CN | 102083129 A | 6/2011 |
| CN | 102300321 A | 12/2011 |

(Continued)

OTHER PUBLICATIONS

International Search Report and Written Opinion of PCT Application No. PCT/CN2017/118342 dated Sep. 20, 2018.

(Continued)

*Primary Examiner* — Raymond S Dean
(74) *Attorney, Agent, or Firm* — Finnegan, Henderson, Farabow, Garrett & Dunner, L.L.P.

(57) ABSTRACT

A power headroom report transmission method includes: determining whether a trigger event for a first serving cell of user equipment exists; transmitting a power headroom report of a first carrier, as a working carrier, of a first serving cell to a base station in case that there is a trigger event; determining whether a power headroom report of a second carrier of the first serving cell has been uploaded, wherein one of the first carrier and the second carrier is the supplement uplink carrier, and the other of the first carrier and the second carrier is a non-supplement uplink carrier; and in case that the power headroom report of the second carrier is not uploaded, transmitting the power headroom report of the second carrier to the base station when the first serving cell switches to the second carrier as the working carrier.

20 Claims, 12 Drawing Sheets

(56) References Cited

U.S. PATENT DOCUMENTS

2013/0188563 A1\* 7/2013 Kim .................. H04W 24/10
370/328
2016/0029235 A1 1/2016 Kim et al.
2021/0022176 A1\* 1/2021 Yang .................. H04W 74/00

FOREIGN PATENT DOCUMENTS

| CN | 105307259 A | 2/2016 |
| --- | --- | --- |
| CN | 105491654 A | 4/2016 |
| CN | 106162853 A | 11/2016 |
| WO | WO 2015/032023 A1 | 3/2015 |

OTHER PUBLICATIONS

First Office Action of Chinese Application No. 201780002373.4 dated Jan. 5, 2021.
Xiaomi, SUL impact on PHR, 3GPP TSG-RAN2 #100, R2-1712375, Reno, Nevada, Nov. 27-Dec. 1, 2017, 4 pages.
InterDigital Inc., Power Headroom Reporting for NR, 3GPP TSG-RAN WG2 Meeting #99bis, R2-1710664, Prague, Czech, Oct. 9-13, 2017, 4 pages.
Xiaomi, Consideration on PHR Trigger Condition for Supporting SUL, 3GPP TSG-RAN2 #100, R2-1800231, Reno, Nevada, Nov. 27-Dec. 1, 2017, 4 pages.

\* cited by examiner

POWER HEADROOM REPORT TRANSMISSION METHOD AND APPARATUS

CROSS-REFERENCE TO RELATED APPLICATION

This application is a continuation application of International Application No. PCT/CN2017/118342, filed Dec. 25, 2017, the entire content of which is incorporated herein by reference.

TECHNICAL FIELD

The present disclosure relates to the technical field of communication, and more particularly, to a power headroom transmission method, a power headroom transmission apparatus, an electronic device and a computer-readable storage medium.

BACKGROUND

In related art, user equipment transmits a power headroom report (PHR) to a base station, so that the base station can determine to adjust power of the user equipment according to the PHR.

A supplement uplink (SUL) carrier is introduced into new radio (NR) to enhance uplink coverage. When a cell is configured with the SUL carrier, the cell may correspond to two uplink carriers, i.e., an SUL carrier and a non-SUL carrier.

In the related art, the user equipment uploads a PHR only once when the PHR is triggered, and only the PHR of a current working carrier of the cell is transmitted to the base station. This may cause the current working carrier of the cell to be the same carrier, for example, the SUL carrier, when the PHR is triggered for several consecutive times. As a result, the user equipment uploads only the PHR of the SUL carrier for several consecutive times, and then the base station may not receive the PHR. of the non-SUL carrier for a long time, so that the base station may not adjust the power of the non-SUL carrier in time.

SUMMARY

According to a first aspect of embodiments of the present disclosure, a power headroom report transmission method is provided. The method is applied to a user equipment and includes: determining whether a trigger event for a first serving cell of the user equipment exists, wherein the first serving cell is configured with a supplement uplink carrier and a non-supplement uplink carrier; transmitting a power headroom report of a first carrier, as a working carrier, of the first serving cell to a base station, in case that the trigger event exists; determining whether a power headroom report of a second carrier of the first serving cell is uploaded, wherein one of the first and second carriers is the supplement uplink carrier, and the other is the non-supplement uplink carrier; and in case that the power headroom report of the second carrier is not uploaded, transmitting the power headroom report of the second carrier to the base station when the first serving cell switches to the second carrier as the working carrier.

According to a second aspect of embodiments of the present disclosure, a power headroom report transmission apparatus is provided. The apparatus may be user equipment and includes a processor and a memory storing instructions executable by the processor. The processor is configured to: determine whether a trigger event for a first serving cell of the user equipment exists, wherein the first serving cell is configured with a supplement uplink carrier and a non-supplement uplink carrier; transmit a power headroom report of a first carrier, as a working carrier, of the first serving cell to a base station, in case that the trigger event exists; determine whether a power headroom report of a second carrier of the first serving cell is uploaded, wherein one of the first and second carriers is the supplement uplink carrier, and the other is the non-supplement uplink carrier; and in case that the power headroom report of the second carrier is not uploaded, transmit the power headroom report of the second carrier to the base station.

According to a third aspect of embodiments of the present disclosure, a non-transitory computer-readable storage medium having instructions stored thereon is provided. When the instructions are executed by a processor of user equipment, the instructions cause the user equipment to perform: determining whether a trigger event for a first serving cell of the user equipment exists, wherein the first serving cell is configured with a supplement uplink carrier and a non-supplement uplink carrier; transmitting a power headroom report of a first carrier, as a working carrier, of the first serving cell to a base station, in case that the trigger event exists; determining whether a power headroom report of a second carrier of the first serving cell is uploaded, wherein one of the first and second carriers is the supplement uplink carrier, and the other is the non-supplement uplink carrier; and in case that the power headroom report of the second carrier is not uploaded, transmitting the power headroom report of the second carrier to the base station when the first serving cell switches to the second carrier as the working carrier.

According to embodiments of the present disclosure, after the first serving cell triggers a power headroom report, and transmits the power headroom report of the first carrier of the first serving cell acting as the working carrier to the base station, whether the power headroom report of the second carrier of the first serving cell is uploaded is further determined, and then the power headroom of the second carrier can be transmitted to the base station when the power headroom report of the second carrier is not, uploaded and the first serving cell switches to the second carrier as the working carrier. Thereby the base station can receive both the power headroom report of the supplement uplink carrier and the power headroom report of the non-supplement uplink carrier of the first serving cell, so that the base station can adjust the power of the supplement uplink carrier in time according to the power headroom report of the supplement uplink carrier, and adjust the power of the non-supplement uplink carrier in time according to the power headroom report of the non-supplement uplink carrier.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices consistent with aspects related to the present disclosure as recited in the appended claims.

Figure 1:
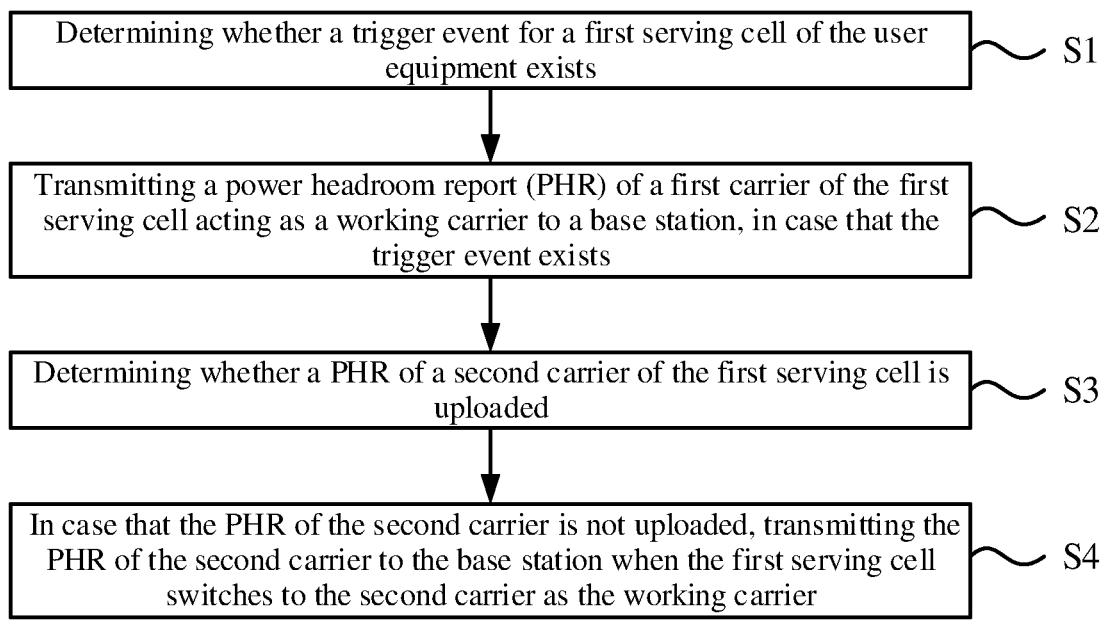
FIG. 1 is a flowchart illustrating a power headroom report transmission method according to an embodiment of the present disclosure.

FIG. 1 is a flowchart illustrating a power headroom report transmission method. according to an embodiment of the present disclosure. The power headroom report transmission method may be applied to user equipment, for example, a mobile phone, a tablet computer, a wearable device, etc. As shown in FIG. 1, the power headroom report transmission method may include the following steps.

In step S1, whether a trigger event for a first serving cell of the user equipment exists is determined, wherein the first serving cell is configured with a supplement uplink carrier and a non-supplement uplink carrier.

In an embodiment, serving cells of the user equipment may include serving cells configured with the supplement uplink carrier and serving cells not configured with the supplement uplink carrier. The first serving cell is a serving cell configured with the supplement uplink carrier.

In an embodiment, a power headroom report may be triggered for the first serving cell in case that a trigger event exists for the first serving cell or that a trigger event exists for any of the serving cells of the user equipment. Both cases can make the user equipment trigger the power headroom report for the first serving cell, which will be described in the following embodiments.

In step S2, a power headroom report of a first carrier of the first serving cell acting as a working carrier is transmitted to a base station, in case that the trigger event exists, wherein an identifier related to triggering of the power headroom report may be generated, and in case that the trigger event exists, the power headroom report is triggered.

In step S3, whether a power headroom report of a second carrier of the first serving cell is uploaded is determined, wherein one of the first and second carriers is the supplement uplink carder, and the other is the non-supplement uplink carrier.

In step S4, in case that the power headroom report of the second carrier is not uploaded, the power headroom report of the second carrier is transmitted to the base station when the first serving cell switches to the second carrier as the working carrier.

In an embodiment, whether the first serving cell switches to the second carrier as the working carrier can be determined according to a. physical downlink control channel (PDCCH) message sent by the base station, or according to a radio resource control (RRC) message sent by the base station.

In an embodiment, after the first serving cell triggers a power headroom report, and transmits the power headroom report of the first carrier of the first serving cell acting as the working carrier to the base station, whether the power headroom report of the second carrier of the first serving cell is uploaded is further determined, and then the power headroom of the second carrier can he transmitted to the base station when the power headroom report of the second carrier is not uploaded and the first serving cell switches to the second carrier as the working carrier. Thereby the base station can receive both the power headroom report of the supplement uplink carrier and the power headroom report of the iron-supplement uplink carrier, of the first serving cell, so that the base station can adjust the power of the supplement uplink carrier in time according to the power headroom report of the supplement uplink carrier, and adjust the power of the non-supplement uplink carrier in time according to the power headroom report of the non-supplement uplink carrier.

In an embodiment, before the power headroom report is transmitted to the base station, it is also determined whether uplink resources that are used for transmitting new data are allocated to the first serving cell, and whether the uplink resources may accommodate a medium access control layer control element (MAC CE) of the power headroom report. When the uplink resources that are used for transmitting new data are allocated to the first serving cell, and the uplink resources may accommodate the medium access control layer control elements of the power headroom report, the power headroom report of the second working carrier is transmitted to the base station.

In an embodiment, whether the power headroom report of the second carrier of the first serving cell is uploaded is determined includes: determining whether the power headroom report of the second carrier is uploaded within a preset duration before the power headroom report of the first carrier is transmitted to the base station.

In an embodiment, the preset duration can be set according to actual requirement. By determining whether the power headroom report of the second carrier is uploaded within the preset duration, monitoring may be performed for the preset duration before the power headroom report of the first carrier is transmitted, instead of monitoring whether the power headroom report of the second carrier is uploaded in all periods of time before the power headroom report of the first carrier is transmitted. Thus, the power headroom report of the second carrier is transmitted to the base station, in case that the power headroom report of the second carrier is not uploaded within the preset duration and the first serving cell switches to the second carrier as the working carrier. Accordingly, a time interval for sending the power headroom report of the second carrier to the base station is not greater than a sum of the preset duration and a duration from sending of the power headroom report of the first carrier to switching to the second carrier as the working carrier.

In an embodiment, the trigger event includes: a prohibit-timer expires, and a path loss change value of the first serving cell is greater than a preset path loss value.

In an embodiment, the trigger event includes at least one of: the first serving cell is activated when configured with uplink resources; the first serving cell is added with primary secondary cell; or the prohibit-timer expires, and the first serving cell has uplink resources to transmit new data, and the first serving cell has an available physical uplink shared channel or an available physical uplink control channel, and a power backoff change value required by the first serving cell having the available physical uplink shared channel or the available physical uplink control channel is greater than a preset backoff value.

In an embodiment, a first trigger event is that the prohibit-timer expires, and a path loss change value of the first serving cell is greater than a preset path loss value; a second trigger event is that the first serving cell is activated when configured with uplink resources; a third trigger event is that the first serving cell is added with primary secondary cell; and a fourth trigger event is that the prohibit-timer expires, and the first serving cell has the uplink resources to transmit new data, and the first serving cell has an available physical uplink shared channel and an available physical uplink control channel, and a power backoff change value required by the first serving cell having the available physical uplink shared channel and the available physical uplink control channel is greater than a preset backoff value.

The four trigger events above may he trigger events for the first serving cell. When any of the tugger events above occurs, it can be determined that the trigger event for the first serving cell of the user equipment exists.

Figure 2:
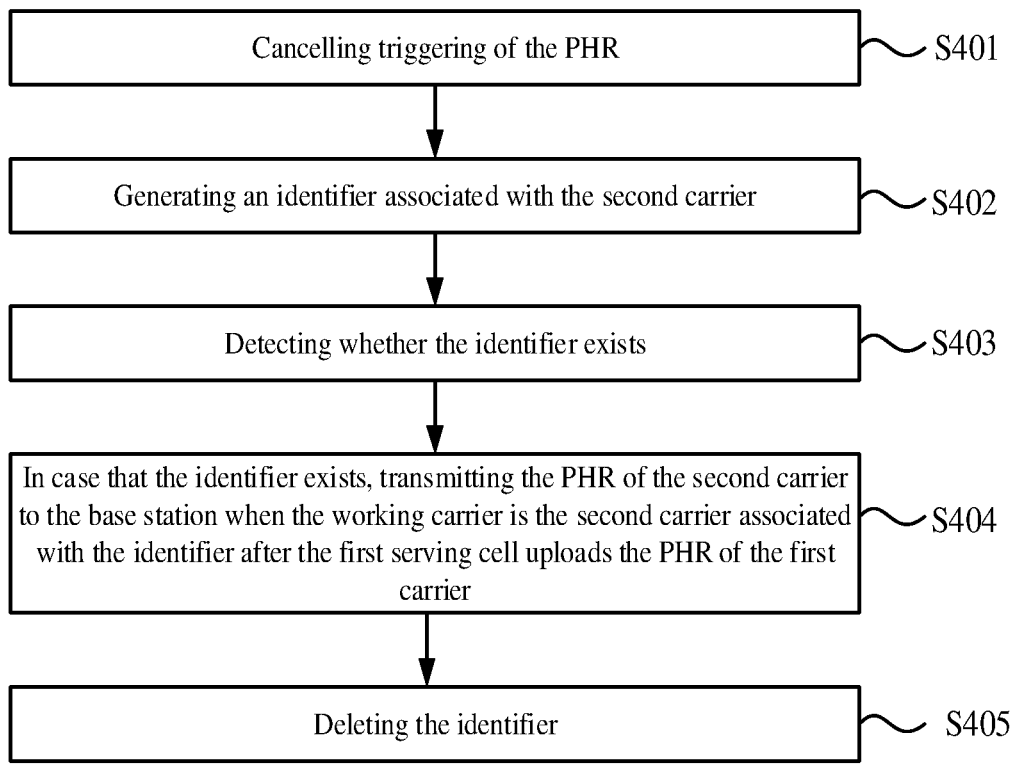
FIG. 2 is a flowchart illustrating a process of transmitting a power headroom report of a second carrier to a base station according to an embodiment of the present disclosure.

FIG. 2 is a flowchart illustrating a process of transmitting a power headroom report of a second carrier to a base station according to an embodiment of the present disclosure. As shown in FIG. 2, based on the embodiment shown in FIG. 1, transmitting the power headroom report of the second carrier to the base station when the first serving cell switches to the second carrier as the working carrier, in case that the power headroom report. of the second carrier is not, uploaded, includes the following steps.

In step S401, triggering of the power headroom report is cancelled, wherein the triggering of the power headroom report is cancelled may include deleting an identifier related to the triggering of the power headroom report.

In step S402, an identifier associated with the second carrier is generated.

In step S403, whether the identifier exists is detected.

In step S404, in case that the identifier exists, the power headroom report of the second carrier is transmitted to the base station when the working carrier is the second carrier associated with the identifier after the first serving cell uploads the power headroom report of the first carrier.

In step S405, the identifier is deleted.

In an embodiment, in case that the trigger event is a trigger event for the first serving cell, whether the power headroom report of the second carrier is uploaded may be determined for the first serving cell in which the trigger event has occurred; and in case that the power headroom report of the second carrier is not uploaded by the first serving cell in which the trigger event has occurred, the triggering of the power headroom report is cancelled, and then, an identifier associated with the second carrier of the first serving cell in which the trigger event has occurred.

Further, in the process of subsequently switching the carrier by the first serving cell in which the trigger event has occurred, whether the identifier exists may be detected; it can be determined that the second carrier is not uploaded in case that the identifier exists, so that when the working carrier is switched to the second carrier in the first serving cell in which the trigger event has occurred, the power headroom report of the second carrier can be transmitted to the base station. As a result, the base station can adjust the power of the supplement uplink carrier according to the power headroom report of the supplement uplink carrier in time, and adjust the power of the non-supplement uplink carrier according to the power headroom report of the nor-supplement uplink carrier in time.

Figure 3:
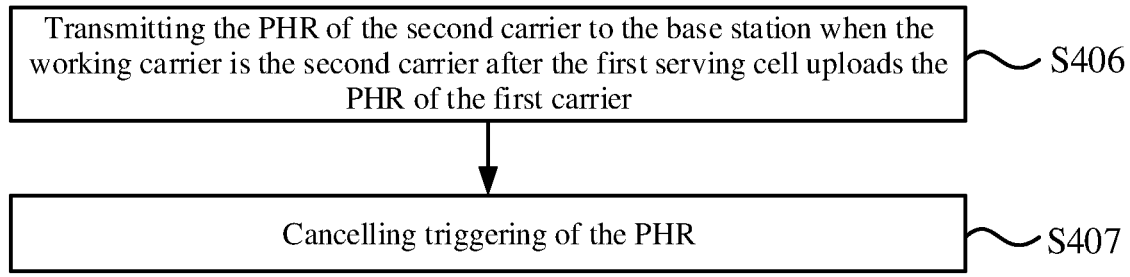
FIG. 3 is a flowchart illustrating a process of transmitting a power headroom report of a second carrier to a base station according to an embodiment of the present disclosure.

FIG. 3 is a flowchart illustrating a process of transmitting a power headroom report of a second carrier to a base station according to an embodiment of the present disclosure. As shown in FIG. 3, based on the embodiment shown in FIG. transmitting the power headroom report of the second carrier to the base station when the first serving cell switches to the second carrier as the working carrier in case that the power headroom report of the second carrier is not uploaded, includes the following steps.

In step S406, the power headroom report of the second carrier is transmitted to the base station when the working carder is the second carder after the first serving cell uploads the power headroom report of the first carrier.

In step S407, triggering of the power headroom report is cancelled.

In an embodiment, in case that the trigger event is a trigger event for the first serving cell, whether the power headroom report of the second carrier is uploaded may be determined for the first serving cell in which the trigger event has occurred. Because the triggering of the power headroom report is not cancelled, the power headroom report of the second carrier can be transmitted to the base station, in case that the power headroom report of the second carrier is not uploaded by the first serving cell in which the trigger event has occurred and the working carrier is switched to the second carrier. As a result, the base station can adjust the power of the supplement uplink carrier according to the power headroom report of the supplement uplink carrier in time, and adjust the power of the non-supplement uplink carrier according to the power headroom report of the non-supplement uplink carder in time. After the power headroom report of the second carrier is transmitted to the base station, triggering of the power headroom report can be cancelled, which avoids transmitting the power headroom report of the second carrier to the base station frequently when the first serving cell in which the trigger event occurs switches the second carrier to the working carrier again in a short time.

In an embodiment, the trigger event includes: any of the serving cells of the user equipment triggers the power headroom report.

In an embodiment, the trigger event for the first serving cell of the user equipment exists may be determined when any of the following trigger events occurs: a first trigger event is that the prohibit-timer expires, and a path loss change value of the first serving cell is greater than a preset path loss value; a second trigger event is that the first serving cell is activated when configured with uplink resources; a third trigger event is that the first serving cell is added with primary secondary cell; a fourth trigger event is that the prohibit-timer expires, and the first serving cell has the uplink resources to transmit new data, and the first serving cell has an available physical uplink shared channel and an available physical uplink control channel, and a power backoff change value required by the first serving cell having the available physical uplink shared channel and the available physical uplink control channel is greater than a preset backoff value; a fifth trigger event is that a periodic-timer expires; and a sixth trigger event is that a message that the base station is configured or reconfigured with a power headroom report reporting function is received, and the message is not intended to cancel the power headroom report reporting function.

In an embodiment, the power headroom report can be reported for all the serving cells respectively, in case that a power headroom report is triggered by any serving cell. For a cell that is not configured with a supplement uplink carrier, only the power headroom report of the non-supplement uplink carrier may be reported, and for a cell that is configured with the supplement uplink carrier, the power headroom report of the second carrier may be transmitted to the base station according to embodiments illustrated below in FIG. 4 or FIG. 5, after the power headroom report of the first carrier is transmitted to the base station.

Figure 4:
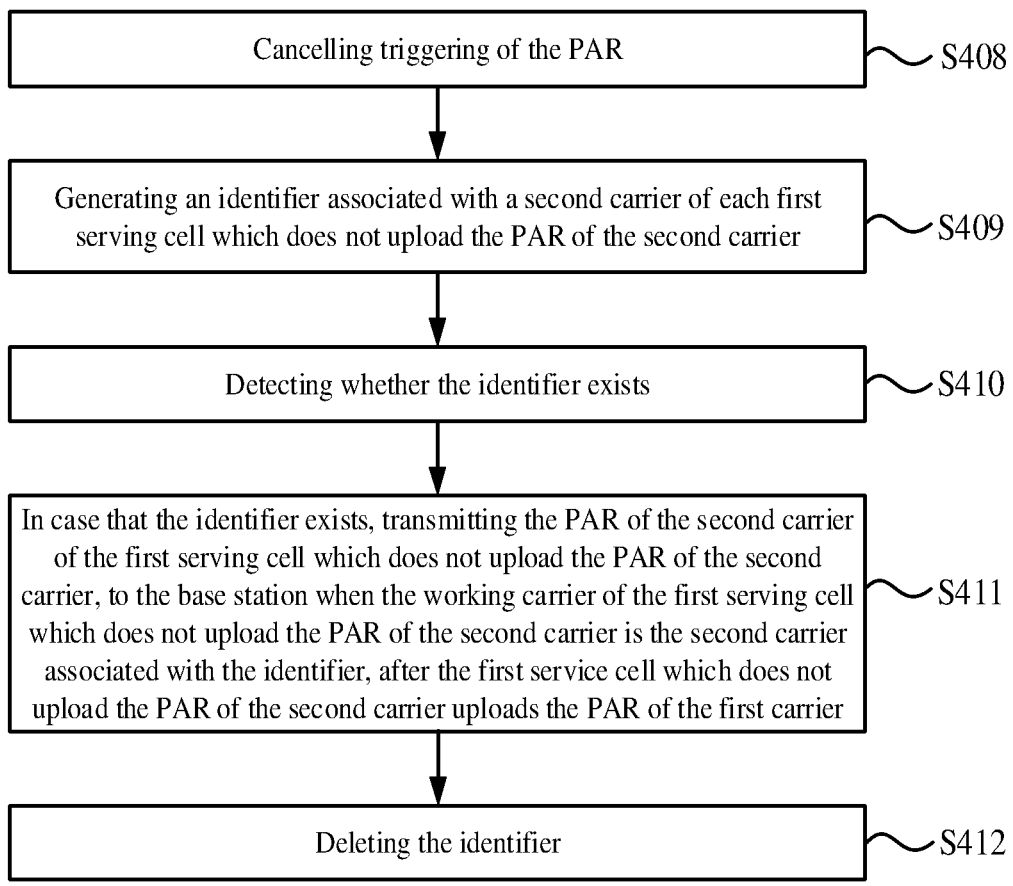
FIG. 4 is a flowchart illustrating a process of transmitting a power headroom report of a second carrier to a base station according to an embodiment of the present disclosure.

FIG. 4 is a flowchart illustrating still a process of transmitting a power headroom report of a second carrier to a base station according to an embodiment of the present disclosure. As shown in FIG. 4, based on the embodiment shown in FIG. 1, the power headroom report of the second carrier is transmitted to the base station when the first serving cell switches the second carrier to the working carrier, in case that the power headroom report of the second carrier is not uploaded, includes the following steps.

In step S408, triggering of the power headroom report is cancelled.

In step S409, an identifier associated with a second carrier of each first serving cell which does not upload the power headroom report of the second carrier is generated.

In step S410, whether the identifier exists is detected.

In step S411, in case that the identifier exists, the power headroom report of the second carrier of the first serving cell which does not upload the power headroom report of the second carrier, is transmitted to the base station when the working carrier of the first serving cell which does not upload the power headroom report of the second carrier is the second carrier associated with the identifier, after the first serving cell which does not uploaded the power headroom report of the second carrier uploads the power headroom report of the first carrier.

In step S412, the identifier is deleted.

In an embodiment, whether the power headroom report of the second carrier is uploaded may be determined for each serving cell configured with a supplement uplink carrier, i.e. each first serving cell, in case that the trigger event is a trigger event for any serving cell; and triggering of the power headroom report is cancelled in case that the power headroom report of the second carrier is not uploaded by the first serving cell, and then, an identifier associated with the second carrier of each first serving cell which does not upload the power headroom report of the second carrier is generated.

Further, in the process of subsequently switching the carrier by the first serving cell in which the power headroom report of the second carrier is not uploaded, whether the identifier exists may be detected; it may be determined that the second carrier(s) of one or more of the first serving cells in which the power headroom report of the second carrier is not uploaded is/are not uploaded, in case that the identifier exists; and thus, when the working carrier is switched in the first serving cells in which the power headroom report of the second carrier is not uploaded, the power headroom report of the second carrier acting as the working carrier may be transmitted to the base station in case that the switched working carrier is the second carrier associated with the identifier. As a result, the base station can adjust the power of the supplement uplink carrier according to the power headroom report of the supplement uplink carrier in time, and adjust the power of the non-supplement uplink carrier according to the power headroom report of the non-supplement uplink carrier in time.

Figure 5:
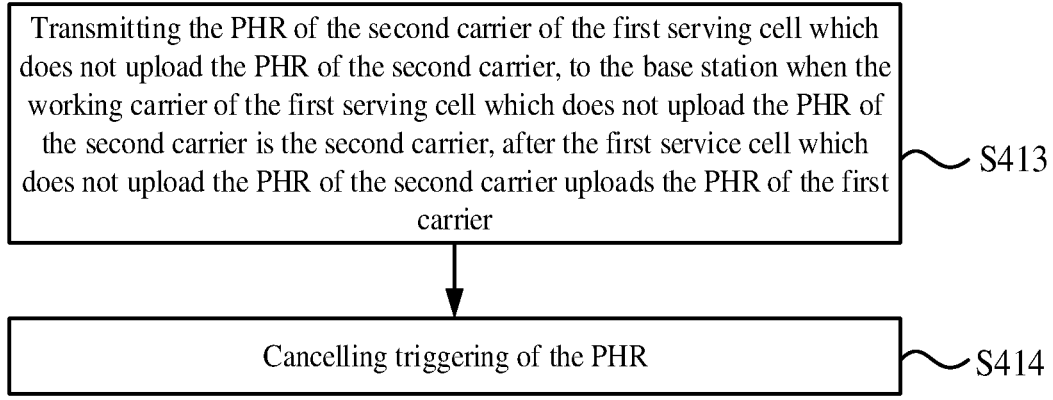
FIG. 5 is a flowchart illustrating a process of transmitting a power headroom report of a second carrier to a base station according to an embodiment of the present disclosure.

FIG. 5 is a flowchart illustrating a process of transmitting a power headroom report of a second carrier to a base station according to an embodiment of the present disclosure. As shown in FIG. 5, based on the embodiment shown in FIG. 1, transmitting the power headroom report of the second carrier to the base station when the first serving cell switches to the second carrier as the working carrier, in case that the power headroom report of the second carrier is not uploaded, includes the following steps.

In step S413, the power headroom report of the second carrier of the first serving cell which does not upload the power headroom report of the second carrier, is transmitted to the base station when the working carrier of the first serving cell which does not, upload the power headroom report of the second carrier is the second carrier, after the first service cell which does not upload the power headroom report of the second carrier uploads the power headroom report of the first carrier.

In step S414, triggering of the power headroom report is cancelled.

In an embodiment, whether the power headroom report of the second carrier is uploaded may be determined for each serving cell configured with a supplement uplink carrier, i.e. each first serving cell, in case that the trigger event is a trigger event for any serving cell. For the first serving cell in which the power headroom report of the second carrier is not uploaded, as triggering of the power headroom report is not cancelled, the power headroom report of the second carrier may be transmitted to the base station when the working carrier of the first serving cell in which the power headroom report of the second carrier is not uploaded is the second carrier. As a result, the base station can adjust the power of the supplement uplink carrier according to the power headroom report of the supplement uplink carrier in time, and adjust the power of the non-supplement uplink carrier according to the power headroom report of the non-supplement uplink carrier in time. After the power headroom report of the second carrier is transmitted to the base station, triggering of the power headroom report may be cancelled, which avoids transmitting the power headroom report of the second carrier to the base station frequently when the first serving cell in which the trigger event occurs switches the second carrier to the working carrier again in a short time.

In an embodiment, the physical uplink shared channel (PUSCH) of the first serving cell is configured on the supplement uplink carrier or the non-supplement uplink carrier according to an indication of a physical downlink control channel (PDCCH) message.

In an embodiment, the PUSCH can dynamically switch between the supplement uplink carrier and the non-supplement uplink carrier, in case that the PUSCH of the first serving cell is configured under a PDCCH indication, and the indication may be configured. on the supplement uplink carrier or the non-supplement uplink carrier. In an embodiment, the power headroom report may be transmitted only for this kind of first serving cell according to the embodiment shown in FIG. 1.

Figure 6:
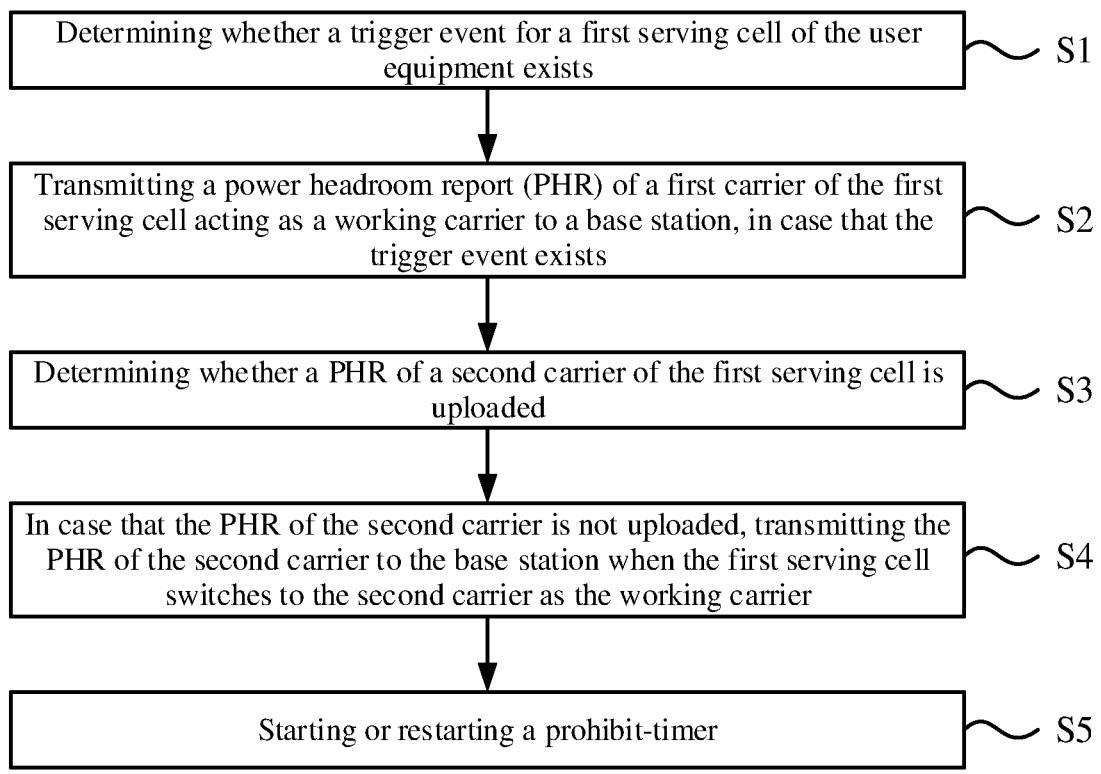
FIG. 6 is a flowchart illustrating a power headroom report transmission method according to an embodiment of the present disclosure.

FIG. 6 is a flowchart illustrating a power headroom report transmission method according to an embodiment of the present disclosure. As shown in FIG. 6, based on the embodiment shown in FIG. 1, the power headroom report transmission method may further include step S5. In step S5, a prohibit-timer is started or restarted.

In an embodiment, the power headroom report is triggered, in case that the prohibit-timer expires, and the path loss change value of at least one of the first serving cells is greater than the preset path loss value.

In an embodiment, the power headroom report is triggered, in case that the prohibit-timer expires, and at least one of the first serving cells has uplink resources to transmit new data, and at least one of the first serving cells has an available physical uplink shared channel or an available physical uplink control channel, and a power backoff change value required by the first serving cell having the available physical uplink shared channel or the available physical uplink control channel is greater than a preset backoff value.

In an embodiment, after the power headroom report of the second carrier is transmitted to the base station, the power headroom report has been transmitted to the base station after the power headroom report is triggered for the serving cell, and thus, the power headroom report may be transmitted to the base station again in case that the prohibit-timer expires, in case that the timing of the prohibit-timer is maintained. As a result, the power headroom report is transmitted to the base station repeatedly in a short time, which wastes the uplink resources. By starting or restarting the prohibit-timer, the prohibit-timer can be retimed, which avoids the wastes in the uplink resources caused by repeatedly transmitting the power headroom report to the base station in a short time.

Figure 7:
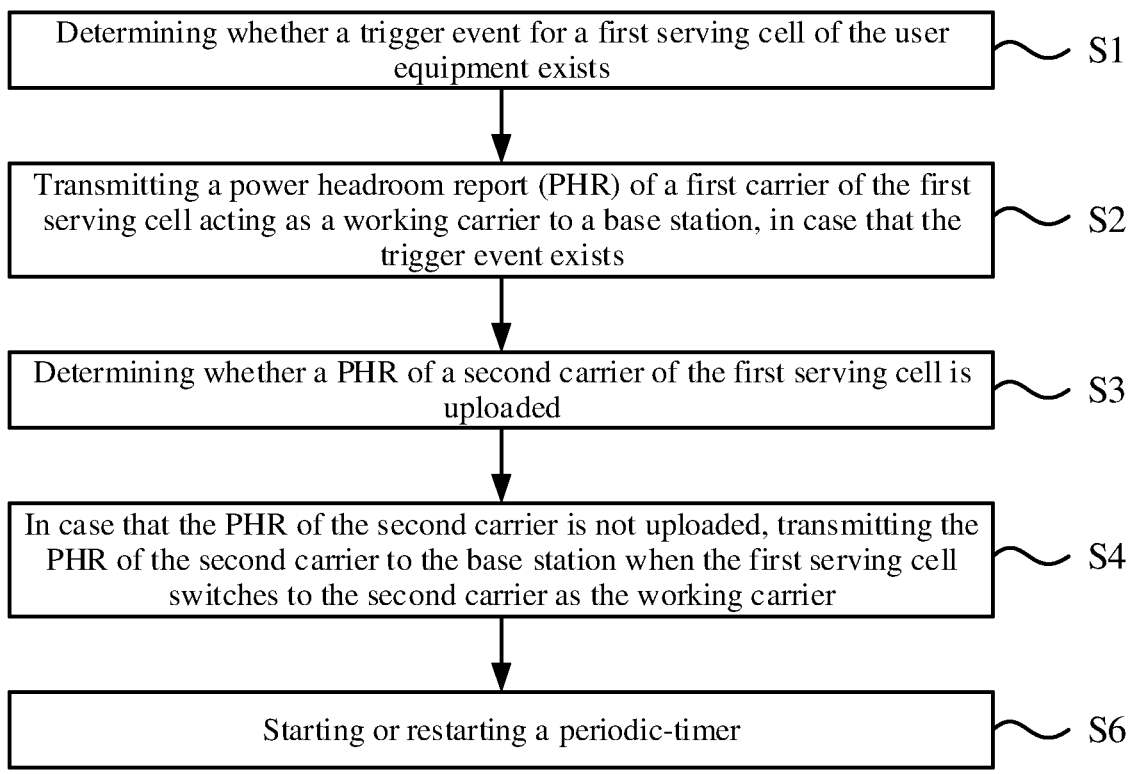
FIG. 7 is a flowchart illustrating a power headroom report transmission method according to an embodiment of the present disclosure.

FIG. 7 is a flowchart illustrating a power headroom report transmission method. according to an embodiment of the present disclosure. As shown in FIG. 7, based on the embodiment shown in FIG. 1, the power headroom report transmission method may further include step S6. In step S6, a periodic-timer is started or restarted.

In an embodiment, the power headroom report is triggered, in case that the periodic-timer.

In an embodiment, after the power headroom report of the second carrier is transmitted to the base station, the power headroom report has been transmitted to the base station after the power headroom report is triggered for the first serving cell, and thus, in case that the timing of the periodic-timer is maintained, the power headroom report can be transmitted to the base station when the periodic-timer expires, As a result, the power headroom report is transmitted to the base station repeatedly in a short time, which wastes the uplink resources. By starting or restarting a periodic-timer, the periodic-timer can be retimed, which avoids the wastes in the uplink resources caused by repeatedly transmitting the power headroom report to the base station in a short time.

Corresponding to the foregoing embodiments of the power headroom report transmission method, the present disclosure further provides embodiments of a power headroom report transmission apparatus.

Figure 8:
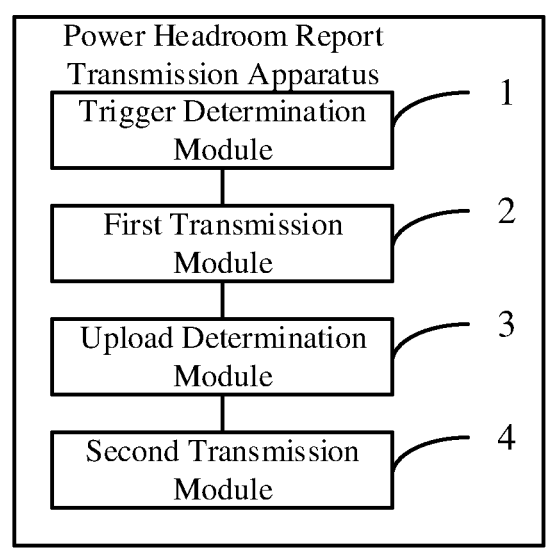
FIG. 8 is a block diagram illustrating a power headroom report transmission apparatus according to an embodiment of the present disclosure.

FIG. 8 is a block diagram illustrating a power headroom report transmission apparatus according to an embodiment of the present disclosure. The apparatus described in this embodiment may be applied to user equipment, for example, a mobile phone, a tablet computer, a wearable device, etc. As shown in FIG. 8, the power headroom report transmission apparatus may include: a trigger determination module 1, a first transmission module 2, an upload determination module 3, and a second transmission module 4.

The trigger determination module 1 is configured to determine whether a trigger event for a first serving cell of the user equipment exists, wherein the first serving cell is configured with a supplement uplink carrier and a non-supplement uplink carrier.

The first transmission module 2 is configured to transmit a power headroom report of a first carrier of the first serving cell acting as a working carrier to a base station, in case that the trigger determination module determines that the trigger event exists.

The upload determination module 3 is configured to determine whether a power headroom report of a second carrier of the first serving cell is uploaded, wherein one of the first and second carriers is the supplement uplink carrier, and the other is the non-supplement uplink carrier.

The second transmission module 4 is configured to transmit the power headroom report of the second carrier to the base station when the first serving cell switches the second carder to the working carrier, in case that the upload determination module determines that the power headroom report of the second carrier is not uploaded.

In an embodiment, the trigger event includes at least one of: a. prohibit-timer expires, and a path loss change value of the first serving cell is greater than a preset path loss value; the first serving cell is activated when configured with uplink resources; the first serving cell is added with primary secondary cell; or the prohibit-timer expires, and the first serving cell has uplink resources to transmit new data, and the first serving cell has an available physical uplink shared channel or an available physical uplink control channel, and a power backoff change value required by the first serving cell having the available physical uplink shared channel or the available physical uplink control channel is greater than a preset backoff value.

Figure 9:
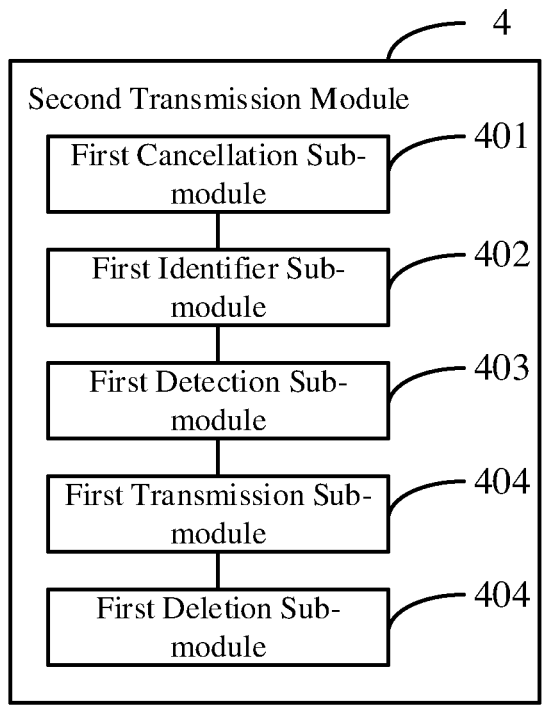
FIG. 9 is a block diagram illustrating a second transmission module according to an embodiment of the present disclosure.

FIG. 9 is a block diagram illustrating a second transmission module according to an embodiment of the present disclosure. As shown in FIG. 9, based on the embodiment shown in FIG. 8, the second transmission module 4 includes: a first cancellation sub-module 401 configured to cancel triggering of the power headroom report; a first identifier sub-module 402 configured to generate an identifier associated with the second carrier; a first detection sub-module 403 configured to detect whether the identifier exists; a first transmission sub-module 404 configured to transmit the power headroom report of the second carrier to the base station when the working carrier is the second carrier associated with the identifier after the first serving cell uploads the power headroom report of the first carrier, in case that the detection sub-module detects that the identifier exists; and a first deletion sub-module 405 configured to delete the identifier.

Figure 10:
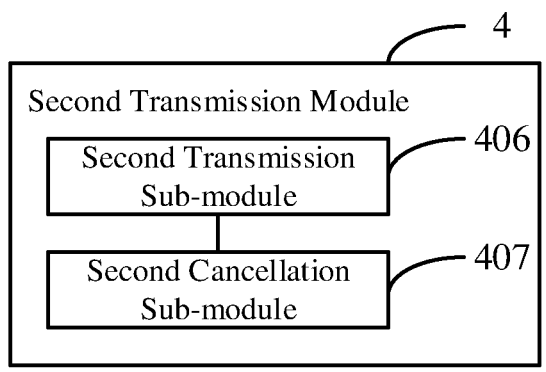
FIG. 10 is a block diagram illustrating a second transmission module according to an embodiment of the present disclosure.

FIG. 10 is a block diagram illustrating a second transmission module according to an embodiment of the present disclosure. As shown in FIG. 10, based on the embodiment shown in FIG. 8, the second transmission. module 4 includes: a second transmission sub-module 406 configured to transmit the power headroom report of the second carrier to the base station when the working carrier is the second carrier after the first serving cell uploads the power headroom report of the first carrier; and a second cancellation sub-module 407 configured to cancel triggering of the power headroom report.

In an embodiment, the trigger event includes: any of the serving cells of the user equipment triggers the power headroom report.

Figure 11:
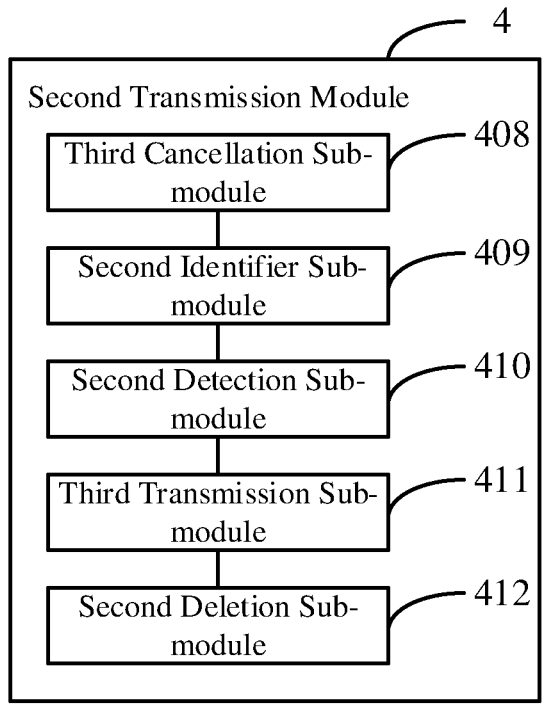
FIG. 11 is a block diagram illustrating a second transmission module according to an embodiment of the present disclosure.

FIG. 11 is a block diagram illustrating a second transmission module according to an embodiment of the present disclosure. As shown in FIG. 11 based on the embodiment shown in FIG. 8. the second transmission module 4 includes: a third cancellation sub-module 408 configured to cancel triggering of the power headroom report; a second identifier sub-module 409 configured to generate an identifier associated with a second. carrier of each first serving cell which does not upload the power headroom report of the second carrier; and a second detection sub-module 410 configured to detect whether the identifier exists. The second transmission module 4 also includes: a third transmission sub-module 411 configured to transmit the power headroom report of the second carrier of the first serving cell which does not upload the power headroom report of the second carrier, to the base station when the working carrier of the first serving cell which does not upload the power headroom report of the second carrier is the second carrier associated with the identifier, after the first service cell Which does not upload the power headroom report of the second carrier uploads the power headroom report of the first carrier, in case that the detection sub-module detects that the identifier exists; and a second deletion sub-module 412 configured to delete the identifier.

Figure 12:
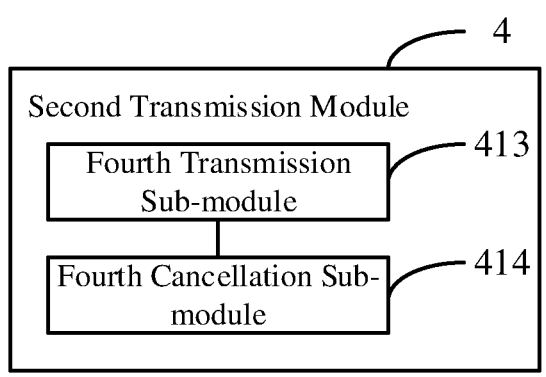
FIG. 12 is a block diagram illustrating a second transmission module according to an embodiment of the present disclosure.

FIG. 12 is a block diagram illustrating a second transmission module according to an embodiment of the present disclosure. As shown in FIG. 12, based on the embodiment shown in FIG. 8, the second transmission module 4 includes: a. fourth transmission. sub-module 413 configured to transmit the power headroom report of the second carrier of the first serving cell, which does not upload the power headroom report of the second carrier, to the base station when the working carrier of the first serving cell which does not upload the power headroom report of the second carrier is the second carrier, after the first service cell which does not upload the power headroom report of the second carrier uploads the power headroom report of the first carrier; and a fourth cancellation sub-module 414 configured to cancel triggering of the power headroom report.

In an embodiment the physical uplink shared channel (PUSCH) of the first serving cell is configured on the supplement uplink carrier or the non-supplement uplink carrier according to an indication of a physical downlink control channel (PDCCH) message.

Figure 13:
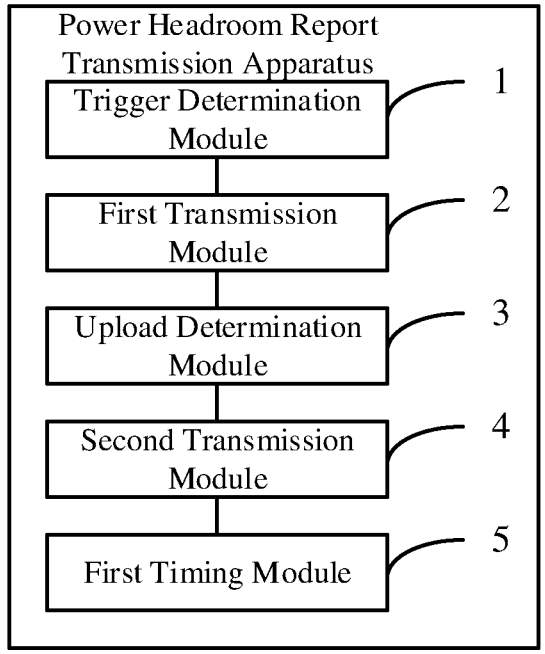
FIG. 13 is a block diagram illustrating a power headroom report transmission apparatus according to an embodiment of the present disclosure.

FIG. 13 is block diagram illustrating a power headroom report transmission apparatus according to an embodiment of the present disclosure. As shown in FIG. 8, based on the embodiment shown in FIG. 8, the apparatus further includes: a first timing module 5 configured to start or restart a prohibit-timer.

In an embodiment, the power headroom report is triggered, in case that the prohibit-timer expires, and the path loss change value of at least one of the first serving cells is greater than the preset path loss value.

In an embodiment, the power headroom report is triggered, in case that the prohibit-timer expires, and at least one of the first serving cells has uplink resources to transmit new data, and at least one of the first serving cells has an available physical uplink shared channel or an available physical uplink control channel, and a power backoff change value required by the first serving cell having the available physical uplink shared channel or the available physical uplink control channel is greater than a preset backoff value.

Figure 14:
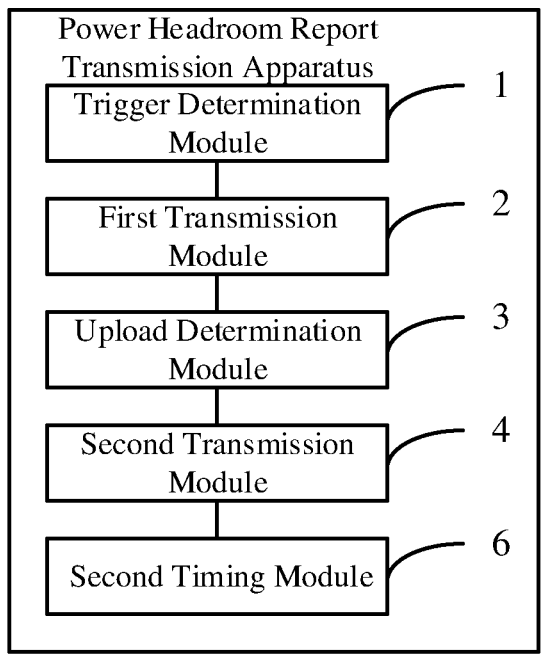
FIG. 14 is a block diagram illustrating a power headroom report transmission apparatus according to an embodiment of the present disclosure.

FIG. 14 is a block diagram illustrating a power headroom report transmission. apparatus according to an embodiment of the present disclosure. As shown in FIG. 14, based on the embodiment shown in FIG. 8, the apparatus further includes: a second timing module 6 configured to start or restart a periodic-timer.

In an embodiment, the power headroom report is triggered, in case that the periodic-timer expires.

With regard to the apparatus in the above embodiments, the specific manner in which each module performs the operation has been. described in detail in the method embodiments, which will not be repeated herein.

The apparatus embodiments described above are merely illustrative, wherein the modules described as separate components may or may not be physically separated, and the components displayed as modules may be located at one place, or may be distributed to multiple networks. Some or all of the modules may be selected according to actual needs. Each of the modules may be hardware, or software, a. combination. of hardware and. software.

The embodiments of the present disclosure further provide an electronic device, such as user equipment, and the device includes: a processor; and a memory for storing processor-executable instructions. The processor is configured to: determine whether a trigger event for a first serving cell of the user equipment exists, wherein the first serving cell is configured with a supplement uplink carrier and a non-supplement uplink carrier; transmit a power headroom report of a first carrier of the first serving cell acting as a working carrier to a base station in case that the trigger event exists; determine whether a power headroom report of a second carrier of the first serving cell is uploaded, wherein one of the first and second carriers is the supplement uplink carrier, and the other is the non-supplement uplink carrier; and transmit the power headroom report of the second carrier to the base station when the first serving cell switches to the second carrier as the working carrier, in case that the power headroom report of the second carrier is not uploaded.

The embodiments of the present disclosure further provide a computer-readable storage medium, which stores a computer program. The program is executed by a processor to perform: determining whether a trigger event for a first serving cell of the user equipment exists, wherein the first serving cell is configured with a supplement uplink carrier and a non-supplement uplink carrier; transmitting a power headroom report of a first carrier of the first serving cell acting as a working carrier to a base station, in case that the trigger event exists; determining whether a power headroom report of a second carrier of the first serving cell is uploaded, wherein one of the first and second carriers is the supplement uplink carrier, and the other is the non-supplement uplink carrier; and transmitting the power headroom report of the second carrier to the base station When the first serving cell switches to the second carrier as the working carrier, in case that the power headroom report of the second carrier is not uploaded.

Figure 15:
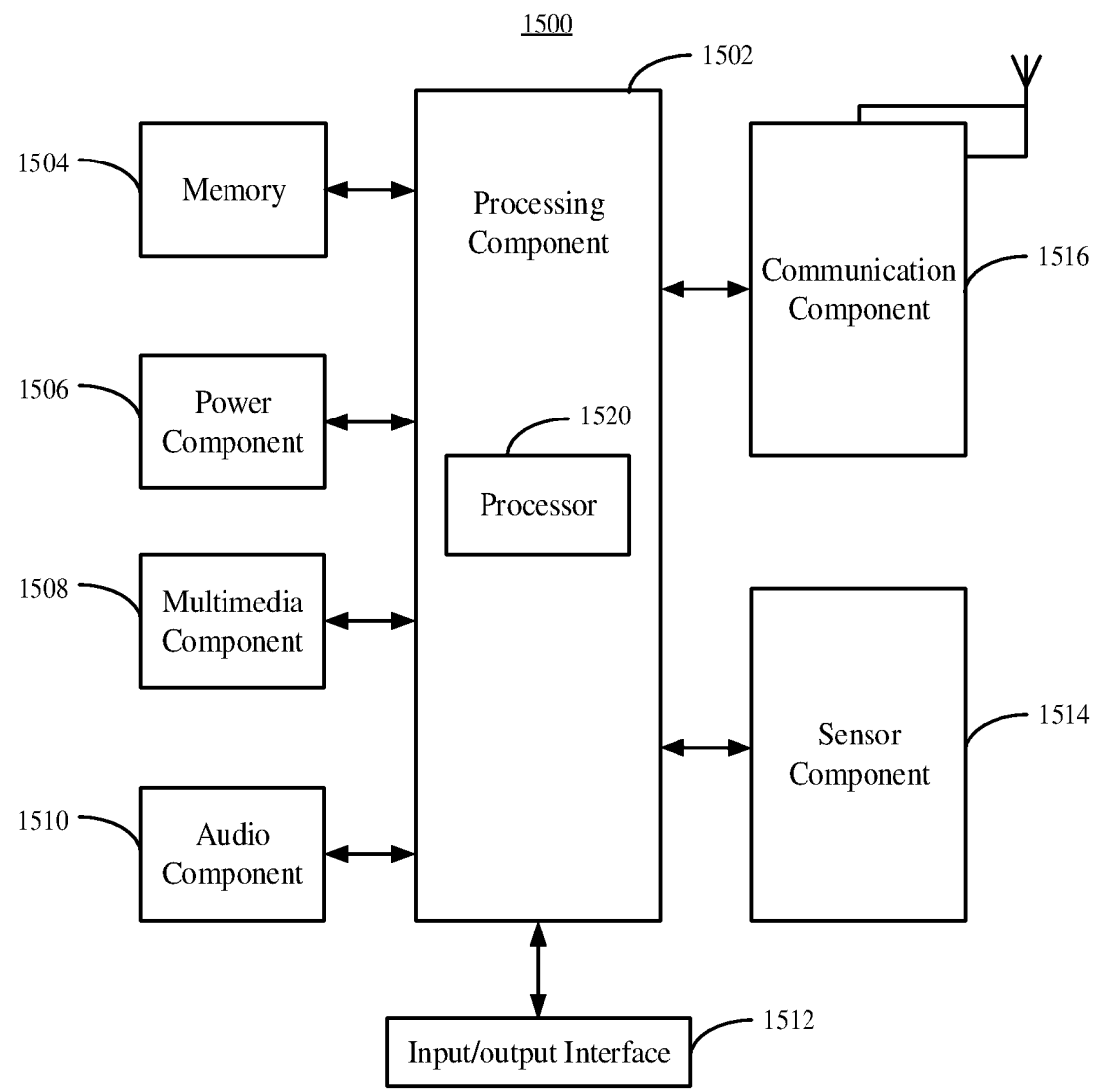
FIG. 15 is a block diagram illustrating a power headroom report transmission apparatus according to an exemplary embodiment.

FIG. 15 is a block diagram illustrating a power headroom report transmission apparatus 1500 according to an exemplary embodiment. For example, the apparatus 1500 may be a mobile phone, a computer, a digital broadcast terminal, a messaging device, a gaming console, a tablet device, a medical device, a fitness equipment, a personal digital assistant, or the like.

Referring to FIG. 15, the apparatus 1500 may include one or more of the following components: a processing component 1502, a memory 1504, a power component 1506, a multimedia component 1508, an audio component 1510, an input/output (I/O) interface 1512, a sensor component 1514, and a communication component 1516.

The processing component 1502 typically controls the overall operations of the apparatus 1500, such as the operations associated with display, telephone calls, data communications, camera operations, and recording operations. The processing component 1502 may include one or more processors 1520 to execute instructions to perform all or part of the steps in the above described methods. Moreover, the processing component 1502 may include one or more modules which facilitate the interaction between the processing component 1502 and other components. For instance, the processing component 1502 may include a multimedia module to facilitate the interaction between the multimedia component 1508 and the processing component 1502.

The memory 1504 is configured to store various types of data to support the operation of the apparatus 1500. Examples of such data include instructions for any applications or methods operated on the apparatus 1500, contact data, phonebook data, messages, pictures, videos, etc. The memory 1504 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1506 provides power to various components of the apparatus 1500. The power component 1506 may include a power management system, one or more power sources, and any other components associated with the generation, management, and distribution of power in the apparatus 1500.

The multimedia component 1508 includes a screen providing an output interface between the apparatus 1500 and the user. in some embodiments, the screen may include a liquid crystal display (LCD) and a touch panel (TP). In case that the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the time duration and pressure associated with the touch or swipe action. In some embodiments, the multimedia component 1508 includes a front camera and/or a rear camera. The front camera and/or the rear camera may receive external multimedia data while the apparatus 1500 is in an operation mode, such as a photographing mode or a video mode. Each of the front camera and the rear camera may be a fixed optical lens system or have focus and optical zoom capability.

The audio component 1510 is configured to output and/or input audio signals. For example, the audio component 1510 includes a microphone (MIC) configured to receive external audio signals when the apparatus 1500 is in an operation mode, such as a call mode, a recording mode, and a voice recognition mode. The received audio signal may be further stored in the memory 1504 or transmitted via the communication component 1516. In some embodiments, the audio component 1510 further includes a speaker for outputting audio signals.

The I/O interface 1512 provides an interface between the processing component 1502 and peripheral interface modules, such as a keyboard, a click wheel, buttons, and the like. The buttons may include, but are not limited to, a home button, a volume button, a start button, and a lock button.

The sensor component 1514 includes one or more sensors to provide status assessments of various aspects of the apparatus 1500. For instance, the sensor component 1514 may detect an on/off status of the apparatus 1500, relative positioning of components, e.g., the display device and the mini keyboard of the apparatus 1500, and the sensor component 1514 may also detect a position change of the apparatus 1500 or a component of the apparatus 1500, presence or absence of user contact with the apparatus 1500, orientation or acceleration/decelerated on of the apparatus 1500, and temperature change of the apparatus 1500. The sensor component 1514 may include a proximity sensor configured to detect the presence of nearby objects without any physical contact. The sensor component 1514 may also include a light sensor, such as a CMOS or CCD image sensor, used for imaging applications. in some embodiments, the sensor component 1514 may also include an accelerometer sensor, a gyroscope sensor, a magnetic sensor, a pressure sensor, or a temperature sensor.

The communication component 1516 is configured to facilitate communication, wired or wirelessly, between the apparatus 1500 and other devices. The apparatus 1500 can access a wireless network based on a communication standard, such as Wi-Fi, 4G, or 5G, or a combination thereof. In an exemplary embodiment, the communication component 1516 receives broadcast signals or broadcast associated information from an external broadcast management system via a broadcast channel. in an exemplary embodiment, the communication component 1516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the methods described above.

In exemplary embodiments, a non-transitory computer-readable storage medium including instructions is also provided, such as the memory 1504 including instructions, executable by the processor 1520 in the apparatus 1500, for performing the above-described methods. For example, the non-transitory computer-readable storage medium may be a ROM, a RAM, a CD-ROM, a magnetic tape, a floppy disc, an optical data storage device, and the like.

Other embodiments of the present disclosure will be apparent to those skilled in the art from consideration of the specification and practice of the present disclosure. This present disclosure is intended to cover any variations, uses, or adaptations of the present disclosure following the general principles thereof and including common knowledge or commonly used technical measures which are not disclosed herein. The specification and embodiments are to be considered as exemplary only, and the true scope and spirit of the present disclosure are indicated by the following claims.

It will be understood that the present disclosure is not limited to the precise structure that has been described above and illustrated in the accompanying drawings, and that various modifications and changes can be made without departing from the scope thereof. The scope of the present disclosure is limited only by the appended claims.

The invention claimed is:

1. A power headroom report transmission method, applied to user equipment, the method comprising:
    determining whether a trigger event for a first serving cell of the user equipment exists, wherein the first serving cell is configured with a supplement uplink carrier and a non-supplement uplink carrier;
    transmitting a power headroom report of a first carrier, as a working carrier, of the first serving cell to a base station, in case that the trigger event exists;
    determining whether a power headroom report of a second carrier of the first serving cell is uploaded, wherein one of the first and second carriers is the supplement uplink carrier, and the other is the non-supplement uplink carrier; and
    in case that the power headroom report of the second carrier is not uploaded, transmitting the power headroom report of the second carrier to the base station when the first serving cell switches to the second carrier as the working carrier.

2. The method according to claim 1, wherein the trigger event comprises at least one of:
    a prohibit-timer expires, and a path loss change value of the first serving cell is greater than a preset path loss value;
    the first serving cell is activated when configured with uplink resources;
    the first serving cell is added with primary secondary cell; or
    the prohibit-timer expires, and the first serving cell has uplink resources to transmit new data, and the first serving cell has an available physical uplink shared channel or an available physical uplink control channel, and a power backoff change value required by the first serving cell having the available physical uplink shared channel or the available physical uplink control channel is greater than a preset backoff value.

3. The method according to claim 2, wherein transmitting the power headroom report of the second carrier to the base station when the first serving cell switches the second carrier to the working carrier comprises:
    cancelling triggering of the power headroom report;
    generating an identifier associated with the second carrier;
    detecting whether the identifier exists;
    in case that the identifier exists, transmitting the power headroom report of the second carrier to the base station when the working carrier is the second carrier associated with the identifier after the first serving cell uploads the power headroom report of the first carrier; and
    deleting the identifier.

4. The method according to claim 2, wherein transmitting the power headroom report of the second carrier to the base station when the first serving cell switches the second carrier to the working carrier comprises:
    transmitting the power headroom report of the second carrier to the base station when the working carrier is the second carrier, after the first serving cell uploads the power headroom report of the first carrier; and
    cancelling triggering of the power headroom report.

5. The method according to claim 1, wherein the trigger event comprises:
    any of serving cells of the user equipment triggers the power headroom report.

6. The method according to claim 5, wherein transmitting the power headroom report of the second carrier to the base station when the first serving cell switches the second carrier to the working carrier comprises:
    cancelling triggering of the power headroom report;
    generating an identifier associated with a second carrier of each first serving cell which does not upload the power headroom report of the second carrier;
    detecting whether the identifier exists;
    in case that the identifier exists, transmitting the power headroom report of the second carrier of the first serving cell which does not upload the power headroom report of the second carrier, to the base station when the working carrier of the first serving cell which does not upload the power headroom report of the second carrier is the second carrier associated with the identifier, after the first service cell which does not upload the power headroom report of the second carrier uploads the power headroom report of the first carrier; and
    deleting the identifier.

7. The method according to claim 5, wherein transmitting the power headroom report of the second carrier to the base station when the first serving cell switches the second carrier to the working carrier comprises:
    transmitting the power headroom report of the second carrier of the first serving cell which does not upload the power headroom report of the second carrier, to the base station when the working carrier of the first serving cell which does not upload the power headroom report of the second carrier is the second carrier, after the first service cell which does not upload the power headroom report of the second carrier uploads the power headroom report of the first carrier; and
    cancelling triggering of the power headroom report.

8. The method according to claim 1, wherein a physical uplink shared channel of the first serving cell is configured on one of the supplement uplink carrier or the non-supplement uplink carrier according to an indication of a physical downlink control channel (PDCCH) message.

9. The method according to claim 1, further comprising:
    starting or restarting a prohibit-timer;
    wherein the power headroom report is triggered, in case that the prohibit-timer expires, and a path loss change value of the first serving cell is greater than a preset path loss value; or
    the power headroom report is triggered, in case that the prohibit-timer expires, and the first serving cell has uplink resources to transmit new data, and the first serving cell has an available physical uplink shared channel or an available physical uplink control channel, and a power backoff change value required by the first serving cell having the available physical uplink shared channel or the available physical uplink control channel is greater than a preset backoff value.

10. The method according to claim 1, further comprising:
starting or restarting a periodic-timer;
wherein the power headroom report is triggered, in case that the periodic-timer expires.

11. User equipment, comprising:
a processor; and
a memory storing instructions executable by processor, wherein the processor is configured to:
determine whether a trigger event for a first serving cell of the user equipment exists, wherein the first serving cell is configured with a supplement uplink carrier and a non-supplement uplink carrier;
transmit a power headroom report of a first carrier, as a working carrier, of the first serving cell to a base station, in case that the trigger event exists;
determine whether a power headroom report of a second carrier of the first serving cell is uploaded, wherein one of the first and second carriers is the supplement uplink carrier, and the other is the non-supplement uplink carrier; and
in case that the power headroom report of the second carrier is not uploaded, transmit the power headroom report of the second carrier to the base station when the first serving cell switches to the second carrier as the working carrier.

12. The user equipment according to claim 11, wherein the trigger event comprises at least one of:
a prohibit-timer expires, and a path loss change value of the first serving cell is greater than a preset path loss value;
the first serving cell is activated when configured with uplink resources;
the first serving cell is added with primary secondary cell; or
the prohibit-timer expires, and the first serving cell has uplink resources to transmit new data, and the first serving cell has an available physical uplink shared channel or an available physical uplink control channel, and a power backoff change value required by the first serving cell having the available physical uplink shared channel or the available physical uplink control channel is greater than a preset backoff value.

13. The user equipment according to 12, wherein the processor is further configured to:
cancel triggering of the power headroom report;
generate an identifier associated with the second carrier;
detect whether the identifier exists;
in case that the identifier exists, transmit the power headroom report of the second carrier to the base station when the working carrier is the second carrier associated with the identifier after the first serving cell uploads the power headroom report of the first carrier; and
delete the identifier.

14. The user equipment according to claim 12, wherein the processor is further configured to:
transmit the power headroom report of the second carrier to the base station when the working carrier is the second carrier after the first serving cell uploads the power headroom report of the first carrier; and
cancel triggering of the power headroom report.

15. The user equipment according to claim 11, wherein the trigger event comprises:
any of serving cells of the user equipment triggers the power headroom report.

16. The user equipment according to claim 15, wherein the processor is further configured to:
cancel triggering of the power headroom report;
generate an identifier associated with a second carrier of each first serving cell which does not upload the power headroom report of the second carrier;
detect whether the identifier exists;
in case that the identifier exists, transmit the power headroom report of the second carrier of the first serving cell which does not upload the power headroom report of the second carrier, to the base station when the working carrier of the first serving cell which does not upload the power headroom report of the second carrier is the second carrier associated with the identifier, after the first service cell which does not upload the power headroom report of the second carrier uploads the power headroom report of the first carrier; and
delete the identifier.

17. The user equipment according to claim 15, wherein the processor is further configured to:
transmit the power headroom report of the second carrier of the first serving cell which does not upload the power headroom report of the second carrier, to the base station when the working carrier of the first serving cell which does not upload the power headroom report of the second carrier is the second carrier, after the first service cell which does not upload the power headroom report of the second carrier uploads the power headroom report of the first carrier; and
cancel triggering of the power headroom report.

18. The user equipment according to claim 11, wherein a physical uplink shared channel of the first serving cell is configured on one of the supplement uplink carrier or the non-supplement uplink carrier according to an indication of a physical downlink control channel (PDCCH) message.

19. The user equipment according to claim 11, wherein the processor is further configured to:
start or restart a prohibit-timer;
wherein the power headroom report is triggered, in case that the prohibit-timer expires, and a path loss change value of the first serving cell is greater than a preset path loss value; or
the power headroom report is triggered, in case that the prohibit-timer expires, and the first serving cell has uplink resources to transmit new data, and the first serving cell has an available physical uplink shared channel or an available physical uplink control channel, and a power backoff change value required by the first serving cell having the available physical uplink shared channel or the available physical uplink control channel is greater than a preset backoff value.

20. The user equipment according to claim 11, wherein the processor is further configured to:
start or restart a periodic-timer;
wherein the power headroom report is triggered, in case that the periodic-timer expires.

* * * * *